(12) United States Patent
Martin Perez (10) Patent No.: US 10,884,757 B2
(45) Date of Patent: Jan. 5, 2021

(54) BOOTING TO A SERVICE

(71) Applicant: Google Inc., Mountain View, CA (US)

(72) Inventor: Alberto Martin Perez, Los Altos, CA (US)

(73) Assignee: Google LLC, Mountain View, CA (US)

( * ) Notice: Subject to any disclaimer, the term of this patent is extended or adjusted under 35 U.S.C. 154(b) by 113 days.

(21) Appl. No.: 15/264,980

(22) Filed: Sep. 14, 2016

(65) Prior Publication Data
US 2018/0074829 A1    Mar. 15, 2018

(51) Int. Cl.
*G06F 9/4401* (2018.01)
*G06F 9/445* (2018.01)

(52) U.S. Cl.
CPC .......... *G06F 9/4406* (2013.01); *G06F 9/4401* (2013.01); *G06F 9/4411* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 7,395,421 B1 * | 7/2008 | Nowlin | G06F 9/441 710/8 |
| 8,875,118 B1 * | 10/2014 | Groothius | G06F 9/44505 717/168 |
| 9,722,859 B2 * | 8/2017 | Bailey | H04L 41/042 |
| 2003/0100340 A1 * | 5/2003 | Cupps | G06F 1/1626 455/556.1 |
| 2004/0006690 A1 * | 1/2004 | Du | G06F 9/441 713/2 |
| 2006/0265579 A1 * | 11/2006 | Seol | G06F 9/441 713/1 |
| 2007/0124570 A1 * | 5/2007 | Chen | G06F 9/4401 713/1 |
| 2008/0046871 A1 * | 2/2008 | Nair | G06F 8/443 717/140 |
| 2008/0072028 A1 * | 3/2008 | Allison | G06F 9/4418 713/1 |
| 2009/0013061 A1 | 1/2009 | Winter et al. | |
| 2012/0109339 A1 * | 5/2012 | Chang | G05B 15/02 700/14 |

(Continued)

OTHER PUBLICATIONS

"In Windows, what is Safe Mode used for and why?", retrieved on Jan. 31, 2017 from http://computer.howstuffworks.com/question575.htm/printable, Feb. 19, 2001, 4 pages.

(Continued)

*Primary Examiner* — Paul Yen
(74) *Attorney, Agent, or Firm* — Brake Hughes Bellermann LLP (57) ABSTRACT

In a general aspect, a computer-implemented method can include receiving, by a device including a plurality of functional elements, an indication of a service to be implemented by the device. The method can also include determining one or more functional elements of the device that are needed to implement the service. The one or more functional elements needed to implement the service can be a subset of the plurality of functional elements of the device. The method can further include initializing the device by activating the one or more functional elements needed to implement the service.

23 Claims, 5 Drawing Sheets

(56) References Cited

U.S. PATENT DOCUMENTS

2014/0344101 A1* 11/2014 Collet ................ G06Q 30/0631
705/26.7

OTHER PUBLICATIONS

International Search Report and Written Opinion for PCT Patent Application No. PCT/US2017/048404, dated Nov. 22, 2017, 9 pages.
Lankhorst et al., "Enabling Technology for Personalizing Mobile Services", Proceedings of the 35th Hawaii International Conference on System Sciences, 2002, pp. 1-8.
Written Opinion for International Application No. PCT/US2017/048404, dated Jul. 19, 2018, 6 pages.

* cited by examiner

BOOTING TO A SERVICE

TECHNICAL FIELD

This disclosure relates to booting (initializing) a device to implement a specific service. More specifically, this disclosure relates to approaches for booting a device (e.g., a computing device, with a full featured and/or general purpose operating system, a device with a plurality of subsystems, etc.) to operate as a specific-use device, or to provide a specific service.

SUMMARY

According to a general aspect, a computer-implemented method can include receiving, by a device including a plurality of functional elements, an indication of a service to be implemented by the device. The method can also include determining one or more functional elements of the device that are needed to implement the service. The one or more functional elements needed to implement the service can be a subset of the plurality of functional elements of the device. The method can further include initializing the device by activating the one or more functional elements needed to implement the service.

Implementations can include one or more of the following features. For example, the one or more functional elements needed to implement the service can be indicated in a table associated with the service. Initializing the device with only the functional elements needed to implement the service can include executing, by the device, an initialization script associated with the service. Receiving the indication of the service to be implemented can include receiving a user input.

The one or more functional elements needed to implement the service can include at least one of a portion of a general purpose operating system of the device, an application program, an application program interface, a hardware device, a codec and/or a device driver.

The method of can include determining that initialization of a first functional element is dependent on a second functional element, where at least the first functional element is included in the subset; initializing the second functional element; and, subsequently, initializing the first functional element using the second functional element. In the event the second functional element is not included in the subset, the method can include deactivating the second functional element, e.g., after initializing the first functional element.

The method can include determining that a functional element needed to implement the service is not present on the device, initializing a functional element of the device not included in the subset and obtaining the functional element not present on the device using the functional element not included in the subset. After obtaining the functional element not present on the device, the method can include activating the obtained functional element and deactivating the functional element not included in the subset.

The service can be a first service and the subset of the plurality of functional elements of the device can be a first subset. The method can include receiving, by the device, an indication of a second service to be implemented by the device and determining one or more functional elements of the device needed to implement the second service. The one or more functional elements needed to implement the second service can be a second subset of the plurality of functional elements of the device. The method can include determining one or more functional elements of the second subset not included in the first subset and initializing the one or more functional elements of the second subset not included in the first subset. The indication of the second service can be received from the first service. The indication of the second service to be implemented can be provided by a functional entity of the plurality of functional elements of the device. The method can include receiving, by the device, an indication to stop implementing the first service. In response to the indication to stop implementing the first service, the method can include deactivating functional elements of the first subset that are not included in the second subset.

According to another general aspect, a non-transitory computer readable medium can have code segments stored thereon. The code segments, when executed by a processor included in a device having a plurality of functional elements, can result in the processor and the device collectively receiving an indication of a service to be implemented by the device and determining one or more functional elements of the device that are needed to implement the service, the one or functional elements needed to implement the service being a subset of the plurality of functional elements of the device. The code segments, when executed by the processor, can also result in the processor and the device collectively initializing the device by activating the one or more functional elements needed to implement the service.

Implementations can include one or more of the following features. For example, the code segments, when executed by the processor, can result in the processor and the device collectively determining that initialization of a first functional element is dependent on a second functional element. At least the first functional element can be included in the subset and initializing the second functional element and, subsequently, initializing the first functional element using the second functional element. In the event the second functional element is not included in the subset, the code segments, when executed by the processor, can result in the processor and the device collectively deactivating the second functional element.

The code segments, when executed by the processor, can result in the processor and the device collectively determining that a functional element needed to implement the service is not present on the device, initializing a functional element of the device not included in the subset and obtaining the functional element not present on the device using the functional element not included in the subset. After obtaining the functional element not present on the device, the code segments, when executed by the processor, can result in the processor and the device collectively activating the obtained functional element and deactivating the functional element not included in the subset.

The service can be a first service and the subset can be a first subset. The code segments, when executed by the processor, can result in the processor and the device collectively receiving, by the device, an indication of a second service to be implemented by the device and determining one or more functional elements of the device needed to implement the second service. The one or more functional elements needed to implement the second service can be a second subset of the plurality of functional elements of the device. The code segments, when executed by the processor, can result in the processor and the device collectively determining one or more functional elements of the second subset not included in the first subset and initializing the one or more functional elements of the second subset not included in the first subset. The code segments, when executed by the processor, can result in the processor and the device collectively receiving, by the device, an indication to stop implementing the first service and, in response to the indication to stop implementing the first service, deactivating functional elements of the first subset that are not included in the second subset.

According to another general aspect, a device can include a processor, a plurality of functional elements operatively associated with the processor and a memory having instructions stored thereon. The instructions, when executed by the processor, can cause the device to receive an indication of a service to be implemented by the device and determine one or more functional elements of the device that are needed to implement the service. The one or more functional elements needed to implement the service can be a subset of the plurality of functional elements of the device. The instructions, when executed by the processor, can cause the device to initialize the device by activating the one or more functional elements needed to implement the service.

Implementations can include one or more of the following features. For example, initializing the device with only the functional elements needed to implement the service can include executing, by the device, an initialization script associated with the service. Receiving the indication of the service can include receiving a user input.

The one or more functional elements needed to implement the service can include at least one of a portion of a kernel of a general purpose operating system of the device, an application program, an application program interface, a hardware device, a codec and/or a device driver.

The service can be a first service and the subset of the plurality of functional elements of the device can be a first subset. The instructions, when executed by the processor, can cause the device to receive an indication of a second service to be implemented by the device and to determine one or more functional elements of the device needed to implement the second service. The one or more functional elements needed to implement the second service can be a second subset of the plurality of functional elements of the device. The instructions, when executed by the processor, can cause the device to determine one or more functional elements of the second subset not included in the first subset and initialize the one or more functional elements of the second subset not included in the first subset. The indication of the second service can be received from the first service.

The instructions, when executed by the processor, can cause the device to receive an indication to stop implementing the first service and, in response to the indication to stop implementing the first service, deactivate one or more functional elements of the first subset that are not included in the second subset.

The instructions, when executed by the processor, can cause the device to receive an indication to stop implementing the second service and, in response to the indication to stop implementing the second service, deactivate the one or more functional elements of the second subset not included in the first subset.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

A device or a system can be referred to herein as being a "full-featured" device or system. For purposes of this disclosure, the term "full-featured" can be used to indicate that a given device or system may include a number of (electronic) components, elements, sub-systems, etc. where the given device or system is configured, after a boot process or an initialization process, to provide and/or implement functionality for all of those components, elements, sub-systems, etc., such as through (under the control or direction of) a central (e.g., general purpose) operating system (OS) for the given device or system, as well as with the use of respective application program interfaces (APIs), respective device drivers, respective codecs, etc. that are associated with the various components, elements, sub-systems, etc. of the given device. While specific examples of such full-featured devices and systems are given herein, it will be appreciated that numerous other devices and systems can be used to implement the approaches described herein.

In the following description, specific details are set forth to provide an understanding of example implementations of systems and corresponding methods for booting (starting, initiating, etc.) a device (e.g., a full-featured device) to operate as a specific-use device (or multiple specific-use devices), or to provide a specific service (or a set of multiple specific services), where the specific-use device(s) or the specific service(s) is(are) implemented or provided using a subset of the features (functionality, components, etc.) of the full-featured device. It will be apparent, however, that the disclosed implementations can be practiced without some of these specific details. In other instances, well-known structures and techniques have not been shown in detail so as not to obscure the disclosure. It is noted that, for purposes of this disclosure, the terms "specific-use device", "specific device", "specific service" and "service" can be used interchangeably.

As some examples, devices (e.g., full-featured devices) that can be started (booted, initiated, etc.) to implement, using the approaches describe herein, a service or operate as a specific-use device can include a smartphone, a laptop computer, a tablet computer, a netbook computer, a vehicle computer (e.g., operationally related systems in a passenger vehicle), a smart television, etc. These devices are given by way of example, and other full-featured devices exist. While a number of examples of services and specific-use devices implemented on a full-featured device are given below, it will be appreciated that these examples are given for purposes of illustration and other services and/or specific-use devices can be implemented using the approaches described herein.

Figure 1:
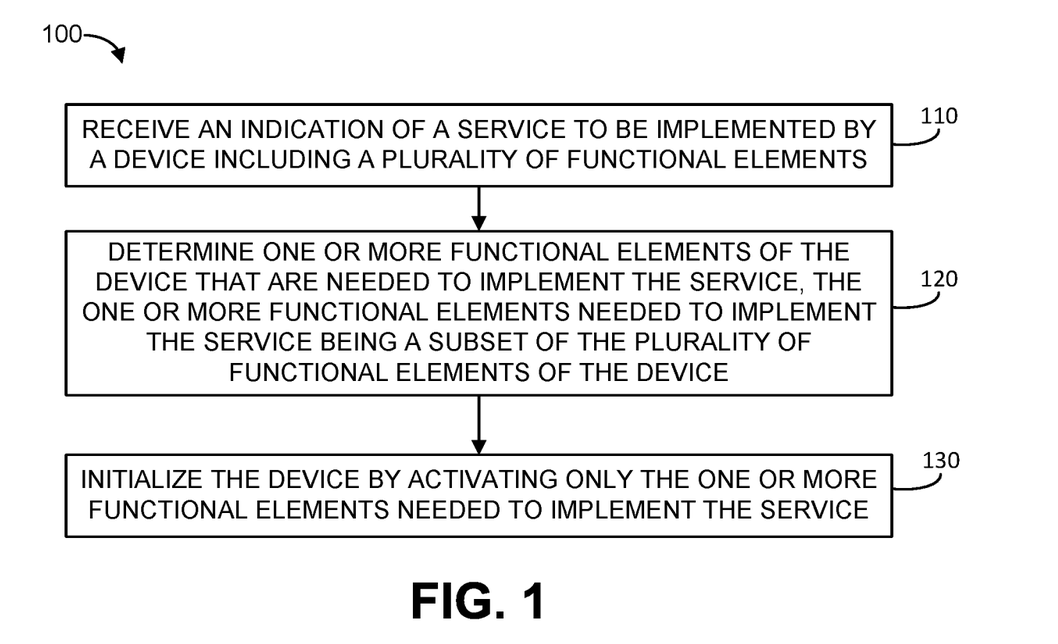
FIG. 1 is a flowchart illustrating a method for implementing a first service and/or a specific-use device.
Figure 2:
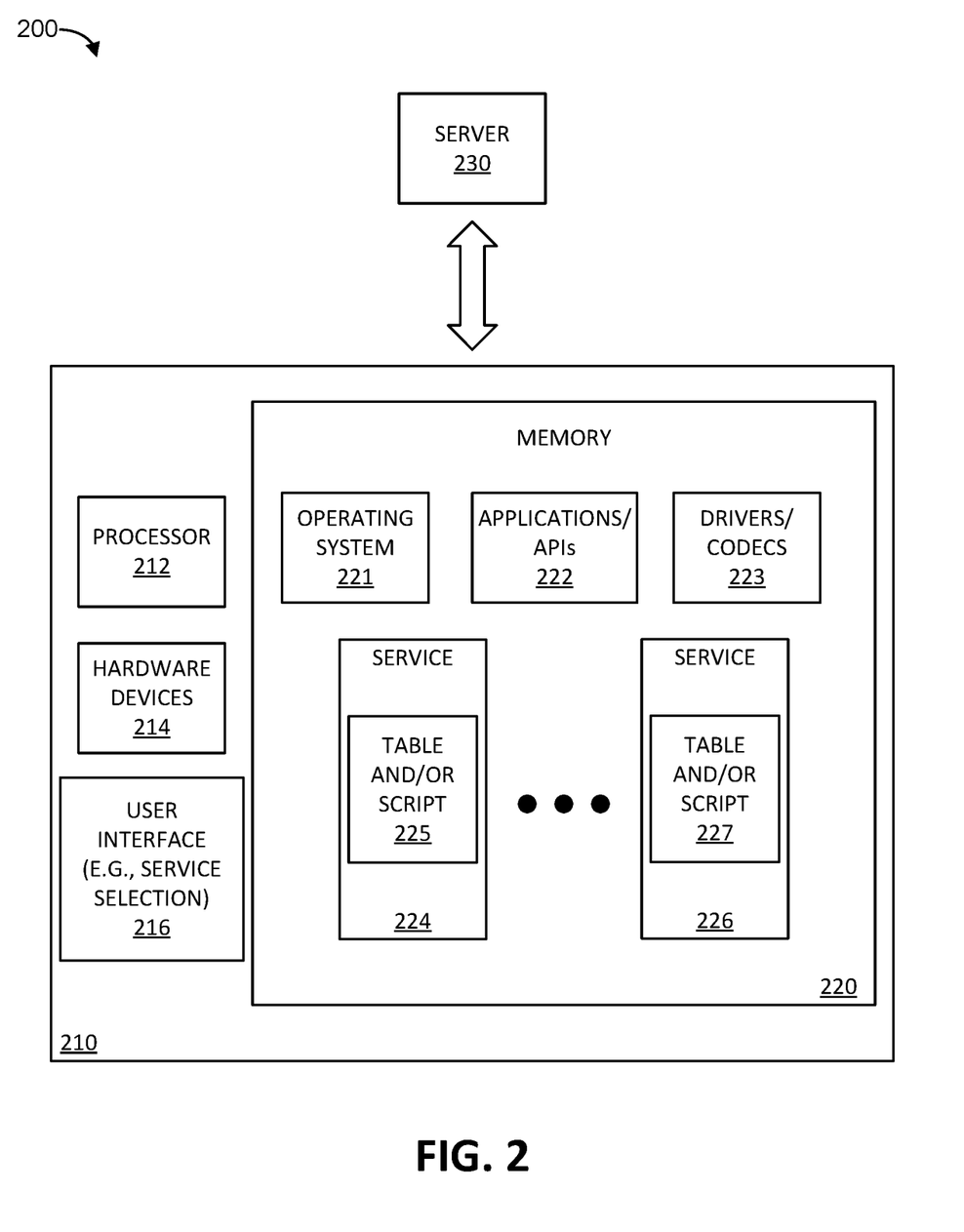
FIG. 2 is a block diagram illustrating a system.

FIG. 1 is a flowchart illustrating a method 100 for implementing a service and/or a specific-use device (e.g., using a full-featured device), according to an implementation. The method 100 of FIG. 1, as well as the methods of FIGS. 3A, 3B, 4 and 5 can be implemented on the system 200 in FIG. 2, which includes a device 210 and a server 230. Accordingly, further reference will be made to FIG. 2 when describing these methods. It is noted that reference to the system 200 of FIG. 2 is made for illustrative purposes and by way of example. In other implementations, devices (e.g., full-featured devices) other than the device 220 and systems other than the system 200 can be used to implement the approaches described herein.

As shown in FIG. 1, the method 100 includes, at block 110, receiving, by a device (e.g., the "full-featured" device 210 in FIG. 2) that includes a plurality of functional elements, an indication of a service to be implemented by the device 210. Referring to the system 200 of FIG. 2, the device 210 is illustrated as including a number of functional elements, such as a processor 212, hardware devices 214 (e.g., a camera, speakers, media devices, a microphone, a network interface, a pointing device, and so forth), an operating system 221 (which can include multiple portions, such as kernel portions, that can be activated separately), applications and associated application program interfaces (APIs) 222 and device drivers and codecs 223. These functional elements of the device 210 are given by way of example and the specific functional elements of a given device will depend on the particular implementation.

At block 110, the indication of the specific-use device and/or service to be implemented on the device 210 can be provided using a user interface 216. Depending on the implementation, the user interface 216 can take a number of forms. For instance, the user interface can be implemented as a graphical user interface (GUI), e.g., where the GUI itself can be implemented as a service on the device 210 using the approaches described herein. In other instances, the GUI can include one or more buttons (hardware buttons or GUI buttons) that, when depressed by a user, indicate a specific-use device or service to be implemented on the device 210. For instance, such a button (e.g., a camera button) could be used to initiate the device 210 to implement a specific-use camera device (e.g., a camera service). Implementing a camera service is given by way of example and for purposes of illustration. It will be appreciated, however, that the approaches described herein can be used to implement any number of other services and/or specific use devices.

Referring again to FIG. 1, at block 120, the method 100 can include determining one or more functional elements of the device 210 that are needed to implement, in this example, the specific-use camera device (e.g., camera service), where the one or more functional elements of the device 210 needed to implement the camera service can be a subset of the plurality of functional elements of the device 210. Further, at block 130, the method 100 can include initializing the device 210 by activating the one or more functional elements needed to implement the camera service (e.g., only the one or more functional elements need to implement the service, including functional elements that can be used to activate other functional elements of the service). Further, at block 130, the method 100 can include initializing the device 210 by activating the one or more functional elements used to implement the service (e.g., the camera service).

In this example, the operations of blocks 120 and 130 can be implemented in the following manner. For instance, referring to FIG. 2, when a button (e.g., a camera button) included in the user interface 216 can be depressed (e.g., as an input from a user), the device 210 may determine which of its functional elements are needed to implement the camera service. For example, such functional elements can include a camera that is included in the hardware devices 214, a camera application/API from the applications/APIs 222 and a camera driver from the drivers/codecs 223. The device 210 can then initiate (start up, enable, etc.) only those functional elements associated with implementing the camera service on the device 210.

Referring still to FIG. 2, the device 210 can include (e.g., in a memory 220) a plurality of service (or specific-use device) definitions 224 to 226 (hereafter referred to as services or service definitions). While only two service definitions 224 and 226 are shown, as indicated in FIG. 2, the device 210 can include additional service definitions. In other implementations, the device 210 could include only a single service definition. Each service definition 224 and 226, as shown in FIG. 2, can include a respective table and/or script 225 or 226 that can be used to implement the associated service. For instance, service 224 may be used to implement a camera service with the device 210 and the table and/or script 225 may include a list of the functional elements associated with implementing the camera service.

In one implementation, the table and/or script 225 can be an executable script that is executed (e.g., by the processor 212) to enable the functional elements needed to implement the camera service 224. In another implementation, a separate application could be run using a table 225 including a list of the functional elements needed to implement the camera service 224.

As noted above, FIG. 2 is a block diagram illustrating a system 200, according to an implementation. As was discussed above, the system 200 includes a device (e.g., full-featured device) 210 and a server 230 that is communicatively coupled (e.g., via a data network such as the Internet) with the device 210. As shown in FIG. 2 and discussed above, the device 210 includes a processor 212, the hardware device 214, the user interface 216 and the memory 220.

In the device 210, while not specifically shown, the memory 220 can include both volatile (e.g., RAM, etc.) and non-volatile (e.g., hard disk, solid-state disk, optical, read-only etc.) memory. The memory 220 can include (e.g., store) the operating system 221, the applications/APIs 222 and the drivers/codecs 223. In other implementations, the device 210 can include other elements, or can omit one or more of the elements shown in FIG. 2.

When implementing a service (e.g., the service 224 or the service 226) on (with, using, etc.) the device 210, functional elements included in the memory 220 can be moved and/or copied between non-volatile memory and volatile memory. For example, one or more portions (e.g., one or more kernel portions) of the operating system can 221 can be moved to RAM memory when implementing a specific service or services, such as a service defined by the service definition 224, a service defined by the service definition 226, and/or a different service. Likewise, one or more applications/APIs associated with a service being implemented can be copied (e.g., loaded) from applications/APIs 222 in non-volatile memory to volatile (e.g., RAM) memory. Any drivers/codecs from the drivers/codecs 223 needed to implement a given service can also be copied to (e.g., loaded into) volatile memory. Similarly, information (e.g., data) associated with implementing a given service (e.g., data for an image taken when implementing the camera service) that is stored in volatile memory can be moved and/or copied to non-volatile memory.

As was also discussed above, the device 210 can implement the services 224 and 226 (or other services) using respective tables and/or scripts 225 and 226, which can include an indication of the functional elements that are needed to implement a corresponding service. In some instances, the device 210 may not include one or more of the functional elements needed for implementing a given service, such as a specific application and/or API, a specific driver, a specific codec, etc. In such situations, the device 210 may obtain such functional elements from the server 230 (or other location) over a data network, or by other mechanisms, such as from an external storage device (e.g., a flash drive) that is operationally coupled with the device 210. While a single server 230 is shown in FIG. 2, it will be appreciated that the device 210 may communicate with any number of other servers. For instance, the device 210 may communicate with media servers when providing a give service, such as a movie streaming service or a music streaming service.

Figure 3A:
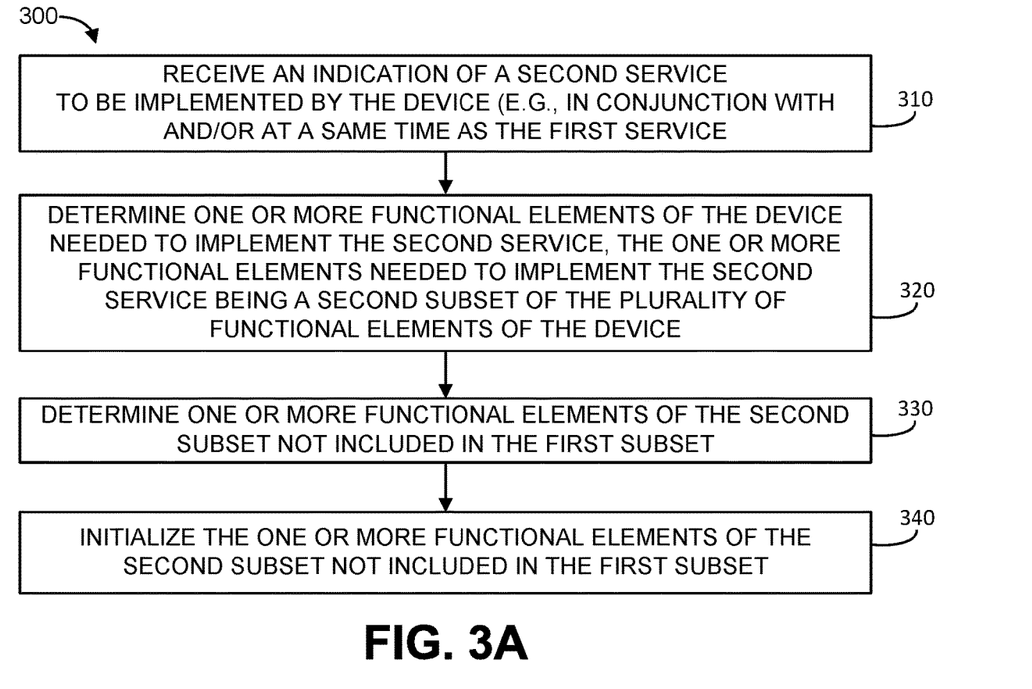
FIGS. 3A and 3B are flowcharts that illustrate, respectively, a method for implementing a second service (and/or second specific-use device) in conjunction with the first service implemented by the method of FIG. 1 and a method for stopping implementation of one of a plurality of services and/or specific-use devices.
Figure 3B:
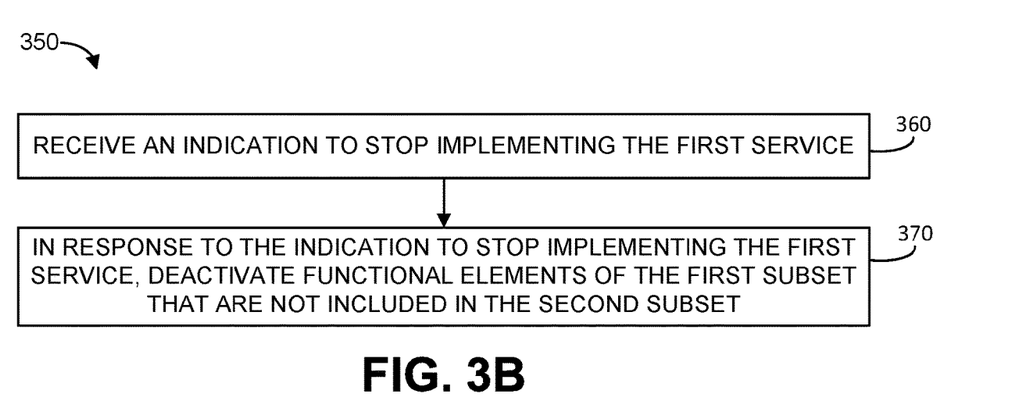

FIGS. 3A and 3B are flowcharts that illustrate, respectively, a method 300 for implementing a second service (and/or second specific-use device) in conjunction with the first service of FIG. 1 and a method 350 for stopping implementation of one of a plurality of services and/or specific-use devices, according to respective implementations. The methods 300 and 350 can be implemented in conjunction with each other and/or in conjunction with the method 100 of FIG. 1. As noted above, the methods 300 and 350 can be implemented in the device 210 of the system 200 in FIG. 2, or can be implemented in other devices and/or systems having other configurations.

In the method 300, when implemented in conjunction with the method 100, the service of the method 100 can be a first service and the subset of the plurality of functional elements of the device 210 for implementing the first service can be a first subset. The method 300, at block 310, includes receiving, by the device 210, an indication of a second service to be implemented by the device 210. The indication the second service can be provided via another user input (e.g., via the user interface 216), in response to action taken by user (as a result of using the first service), and/or can be provided by the first service. In certain implementations, the second service (and/or additional services) can be implemented along with (in conjunction with, at a same time as, etc.) the first service.

Using the example above, where the first service is a camera service, a user can take a picture using the camera service and, in response to the picture being taken, the camera service (or the user via the user interface 216) can then request that the device 210 implement a photo sharing service. Implementing the photo sharing service can include, at block 330, determining one or more functional elements of the device 210 needed to implement the second (e.g., photo sharing) service. The one or more functional elements needed to implement the photo sharing service can be a second subset of the plurality of functional elements of the device 210.

Implementing such a photo sharing service (or other services in other implementations) can also include, at block 330, determining one or more functional elements of the second subset that are not included in the first subset. For instance, a photo sharing service definition (e.g., service 226) may include the elements of the of the camera service discussed above with respect to FIG. 1, as well as a photo sharing application/API from the applications/APIs 222 and a network interface of the hardware devices 214 (and any associated network drivers from the drivers/codecs 223). In other instances, the photo sharing service definition may not include one or more elements of the camera service. The network interface may be used to communicate with the sever 230, e.g., to share (upload) the photo to a photo sharing (storage) account associated with the device 210 and/or a user of the device 210. At block 340, the method 300 can include, when implementing the photo sharing service, initializing the one or more functional elements of the second subset not included in the first subset (e.g., the photo sharing application, the network interface and the network interface driver(s) in this example).

Referring to FIG. 3B, the method 350 includes, at block 360, receiving an indication to stop implementing the first service (e.g., the camera service in the above example). While the method 350 is directed to stopping implementation of the first service (e.g., the service of the method 100), in other implementations, the approaches of the method 350 can be used to stop the implementation of the second service of the method 300 (e.g., the photo sharing service in the above example). The method 350 further includes, at block 370, in response to the indication at block 360, deactivating (e.g., stopping, disabling, shutting down, etc.) functional elements of the first subset (the functional elements of the first service of the method 100) that are not included in the second subset (the functional elements of the second service of the method 300).

Using the methods 100, 300 and 350 in conjunction with one another, services (specific-use devices) can be started and stopped on an on demand basis, multiple services can be implemented together, and so forth. Such approaches can provide for much more efficient uses of the resources of a device (e.g., the device 210) that is used to implement such services. Further, start up time for implementing a given service (specific-use device) can be greatly reduced as compared to booting a full-featured device with all of its functional elements initialized (activated, started, etc.).

Figure 4:
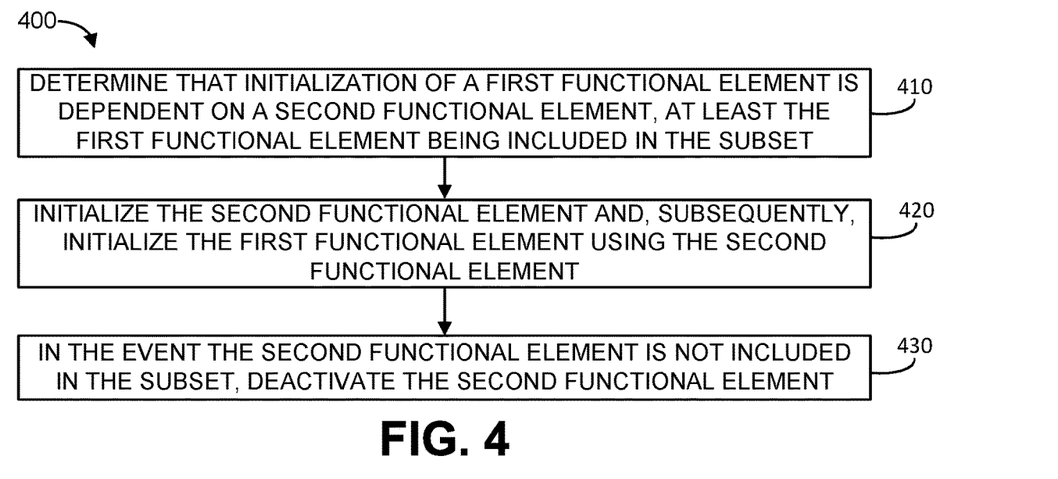
FIG. 4 is a flowchart illustrating a method that can be implemented in conjunction with the method of FIG. 1.

FIG. 4 is a flowchart illustrating a method 400 that can be implemented in conjunction with the method 100 of FIG. 1, according to an implementation. The method 400 can be used to initialize functional elements of a given service, where activating (initializing, starting, etc.) one or more of the functional elements of the given service are dependent on another functional element. For instance, at block 410, the method 400 can include determining that initialization of a first functional element is dependent on a second functional element. In such an approach, at least the first functional element can be included in the subset of functional elements of the service to be implemented (e.g., the subset of block 120 of the method 100). At block 420, the method 400 can further include initializing the second functional element and, subsequently, initializing the first functional element using the second functional element.

As an example of the operations of blocks 410 and 420 of the method 400, a given service may require a specific driver (or other functional element that may be stored in non-volatile memory), the specific driver being the first functional element of block 410. Activating that driver may be dependent on having access to non-volatile memory, e.g., to copy the driver to volatile memory (e.g., RAM). In this situation, a functional element (e.g., the second functional element of block 410) that is needed to provide access to non-volatile memory and the (first functional element) driver can be activated, even if that second functional element is not included in the first subset of functional elements needed to implement the service of the method 100.

At block 430, if the second functional element (of blocks 410 and 420) is not included the subset of functional elements associated with the first service of the method 100 (e.g., not needed to implement the first service, as noted above), the second functional element can be deactivated. In other implementations, the second functional element can be used to activate other functional elements that are needed to implement a given service (e.g., the first service of the method 100) before being deactivated at block 430.

Figure 5:
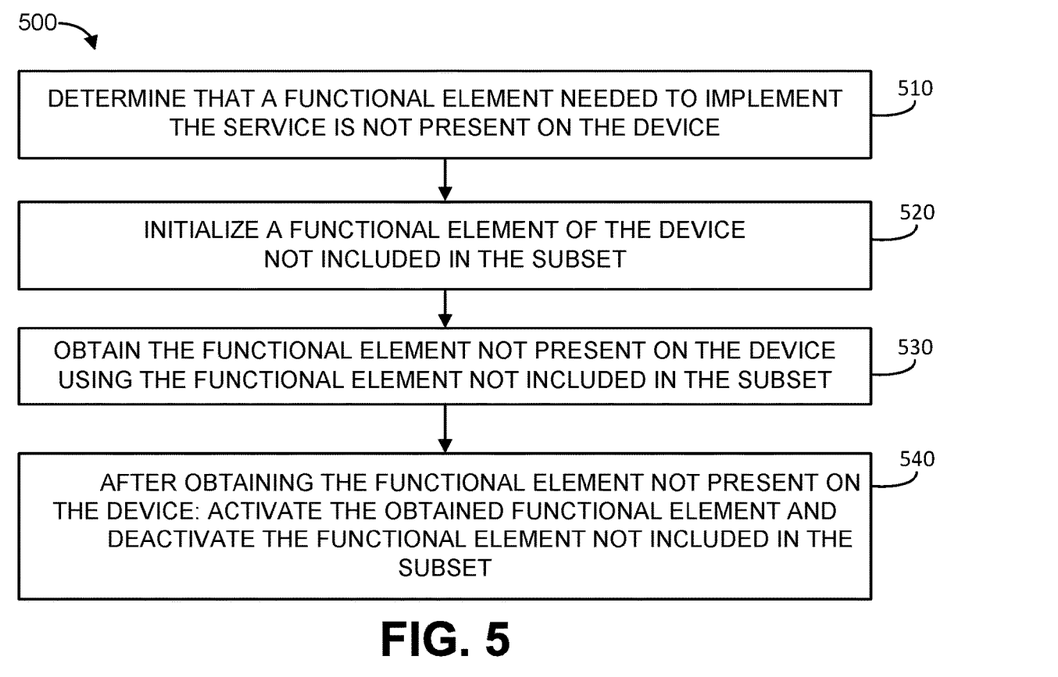
FIG. 5 is a flowchart illustrating a method that can be implemented in conjunction with the method of FIG. 1.

FIG. 5 is a flowchart illustrating a method 500 that can be implemented in conjunction with the method of FIG. 1, according to an implementation. The method 500 can be used, as was briefly discussed above, to obtain a functional element that is included in a service definition (e.g., the service definition 224 or 226), but is (at the time the service is being initiated) not available on the device 210.

For example, at block 510, the method 500, when implemented on the device 210, can include determining that a functional element needed to implement a given service (e.g., the service of the method 100) is not present on the device 210. The method 500 can further include, at block 520, initializing a functional element of the device that is not included in the subset and, at block 530, can include obtaining the functional element of block 510 that is not present on the device 210. As shown at block 530, the functional element of block 510 can be obtained using the functional element of block 520 that is not included in the subset. At block 540, the method 500 can further include, after obtaining the functional element not present on the device at block 530, activating the obtained functional element and deactivating the functional element not included in the subset.

As an example, when implementing the method 500 in connection with the method 100, the service being implemented by the method 100 may be a movie streaming service or an audio streaming service to stream locally available media files (e.g., movies or music). In this example, a service definition for the streaming service to be implemented by the method 100 may indicate a specific codec (or codecs) that are needed to implement the service, where the specific codec in the service definition is not included on the device 210 (e.g., is not present in the driver/codecs 223 in the memory 220). In this situation, using the method 500, the device 210 may, at block 520, activate a network interface functional element, or a network interface service (which may not be needed to stream locally available media), at block 530, obtain the specific codec from the server 230 and, at block 540, activate the obtained codec and deactivate the network interface (e.g., service). In certain implementations, the network interface can be deactivated prior to activating the obtained codec.

Depending on the specific implementation, the obtained codec can be persistently stored in the device 210, or can be discarded once the service is terminated. If the obtained codec is stored, subsequent requests to implement the same media streaming service can be performed by the method of 100 without using the method 500 to obtain the specific codec. In instances where the codec is discarded, the method 500 can be used each time the same media streaming service is implemented in order to obtain the specific codec, which me be advantageous as the media streaming service can be implemented using a most recent version of the specific codec each time it is initiated.

While the foregoing description sets forth examples of specific services and/or specific-use devices that can be implemented using the approaches and techniques described herein, it will be appreciated that any number of other services and/or specific-use devices can be implemented using the system 200, or using systems and/or devices having other configurations, in conjunction with the methods 100, 300, 350, 400 and 500. For example, the approaches described herein can be implemented in a passenger vehicle to implement services of the electronic (e.g., computer-based or controlled) systems of the vehicle as needed (on-demand). For instance, a backup camera service of a vehicle could be initiated when a driver of the vehicle (or another service, such as a self-driving service) puts the vehicle in reverse. The backup camera service can then be deactivated (stopped, etc.) when the vehicle is taken out of reverse (e.g., put in park or drive). Other systems in the vehicle can be activated and deactivated in similar fashion, such as using the methods 100, 300, 350, 400 and/or 500, as appropriate.

Other examples of services and/or specific-use devices that can be implemented using the approaches described herein are a book reader service, wherein only functional elements needed to use a given device to read a book are activated, and a science experiment device, where only functional elements, such as certain sensors, of a given device that are need to perform a specific science experiment are activated.

In some implementations, a device (e.g., the device 210) can be configured to implement a specific service based on the identity of a user that is accessing (using) the device. For example, for a device that is used in an education administrative setting, the device, when being used by a school principal, may implement a service that provides the principal access to all employment records and all student records for a corresponding school. The same device may also implement a gradebook service when it is accessed by individual teachers, where the gradebook service provides each teacher access to records only for students in his or her class, or classes.

The foregoing examples are provided for purposes of illustration. Other services and/or specific-use devices can be implemented using the device 210 and the system 200, and/or devices (full-featured devices) and systems having other configurations.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected, how that information is used, and what information is provided to the user.

According to a general aspect, a computer-implemented method can include receiving, by a device including a plurality of functional elements, an indication of a service to be implemented by the device. The method can also include determining one or more functional elements of the device that are needed to implement the service. The one or more functional elements needed to implement the service can be a subset of the plurality of functional elements of the device. The method can further include initializing the device by activating the one or more functional elements needed to implement the service.

Implementations can include one or more of the following features. For example, the one or more functional elements needed to implement the service can be indicated in a table associated with the service. Initializing the device with only the functional elements needed to implement the service can include executing, by the device, an initialization script associated with the service. Receiving the indication of the service to be implemented can include receiving a user input.

The one or more functional elements needed to implement the service can include at least one of a portion of a general purpose operating system of the device, an application program, an application program interface, a hardware device, a codec and/or a device driver.

The method of can include determining that initialization of a first functional element is dependent on a second functional element, where at least the first functional element is included in the subset; initializing the second functional element; and, subsequently, initializing the first functional element using the second functional element. In the event the second functional element is not included in the subset, the method can include deactivating the second functional element, e.g., after initializing the first functional element.

The method can include determining that a functional element needed to implement the service is not present on the device, initializing a functional element of the device not included in the subset and obtaining the functional element not present on the device using the functional element not included in the subset. After obtaining the functional element not present on the device, the method can include activating the obtained functional element and deactivating the functional element not included in the subset.

The service can be a first service and the subset of the plurality of functional elements of the device can be a first subset. The method can include receiving, by the device, an indication of a second service to be implemented by the device and determining one or more functional elements of the device needed to implement the second service. The one or more functional elements needed to implement the second service can be a second subset of the plurality of functional elements of the device. The method can include determining one or more functional elements of the second subset not included in the first subset and initializing the one or more functional elements of the second subset not included in the first subset. The indication of the second service can be received from the first service. The indication of the second service to be implemented can be provided by a functional entity of the plurality of functional elements of the device. The method can include receiving, by the device, an indication to stop implementing the first service. In response to the indication to stop implementing the first service, the method can include deactivating functional elements of the first subset that are not included in the second subset.

According to another general aspect, a non-transitory computer readable medium can have code segments stored thereon. The code segments, when executed by a processor included in a device having a plurality of functional elements, can result in the processor and the device collectively receiving an indication of a service to be implemented by the device and determining one or more functional elements of the device that are needed to implement the service, the one or functional elements needed to implement the service being a subset of the plurality of functional elements of the device. The code segments, when executed by the processor, can also result in the processor and the device collectively initializing the device by activating the one or more functional elements needed to implement the service.

Implementations can include one or more of the following features. For example, the code segments, when executed by the processor, can result in the processor and the device collectively determining that initialization of a first functional element is dependent on a second functional element. At least the first functional element can be included in the subset and initializing the second functional element and, subsequently, initializing the first functional element using the second functional element. In the event the second functional element is not included in the subset, the code segments, when executed by the processor, can result in the processor and the device collectively deactivating the second functional element.

The code segments, when executed by the processor, can result in the processor and the device collectively determining that a functional element needed to implement the service is not present on the device, initializing a functional element of the device not included in the subset and obtaining the functional element not present on the device using the functional element not included in the subset. After obtaining the functional element not present on the device, the code segments, when executed by the processor, can result in the processor and the device collectively activating the obtained functional element and deactivating the functional element not included in the subset.

The service can be a first service and the subset can be a first subset. The code segments, when executed by the processor, can result in the processor and the device collectively receiving, by the device, an indication of a second service to be implemented by the device and determining one or more functional elements of the device needed to implement the second service. The one or more functional elements needed to implement the second service can be a second subset of the plurality of functional elements of the device. The code segments, when executed by the processor, can result in the processor and the device collectively determining one or more functional elements of the second subset not included in the first subset and initializing the one or more functional elements of the second subset not included in the first subset. The code segments, when executed by the processor, can result in the processor and the device collectively receiving, by the device, an indication to stop implementing the first service and, in response to the indication to stop implementing the first service, deactivating functional elements of the first subset that are not included in the second subset.

According to another general aspect, a device can include a processor, a plurality of functional elements operatively associated with the processor and a memory having instructions stored thereon. The instructions, when executed by the processor, can cause the device to receive an indication of a service to be implemented by the device and determine one or more functional elements of the device that are needed to implement the service. The one or more functional elements needed to implement the service can be a subset of the plurality of functional elements of the device. The instructions, when executed by the processor, can cause the device to initialize the device by activating the one or more functional elements needed to implement the service.

Implementations can include one or more of the following features. For example, initializing the device with only the functional elements needed to implement the service can include executing, by the device, an initialization script associated with the service. Receiving the indication of the service can include receiving a user input.

The one or more functional elements needed to implement the service can include at least one of a portion of a kernel of a general purpose operating system of the device, an application program, an application program interface, a hardware device, a codec and/or a device driver.

The service can be a first service and the subset of the plurality of functional elements of the device can be a first subset. The instructions, when executed by the processor, can cause the device to receive an indication of a second service to be implemented by the device and to determine one or more functional elements of the device needed to implement the second service. The one or more functional elements needed to implement the second service can be a second subset of the plurality of functional elements of the device. The instructions, when executed by the processor, can cause the device to determine one or more functional elements of the second subset not included in the first subset and initialize the one or more functional elements of the second subset not included in the first subset. The indication of the second service can be received from the first service.

The instructions, when executed by the processor, can cause the device to receive an indication to stop implementing the first service and, in response to the indication to stop implementing the first service, deactivate one or more functional elements of the first subset that are not included in the second subset.

The instructions, when executed by the processor, can cause the device to receive an indication to stop implementing the second service and, in response to the indication to stop implementing the second service, deactivate the one or more functional elements of the second subset not included in the first subset.

Figure 6:
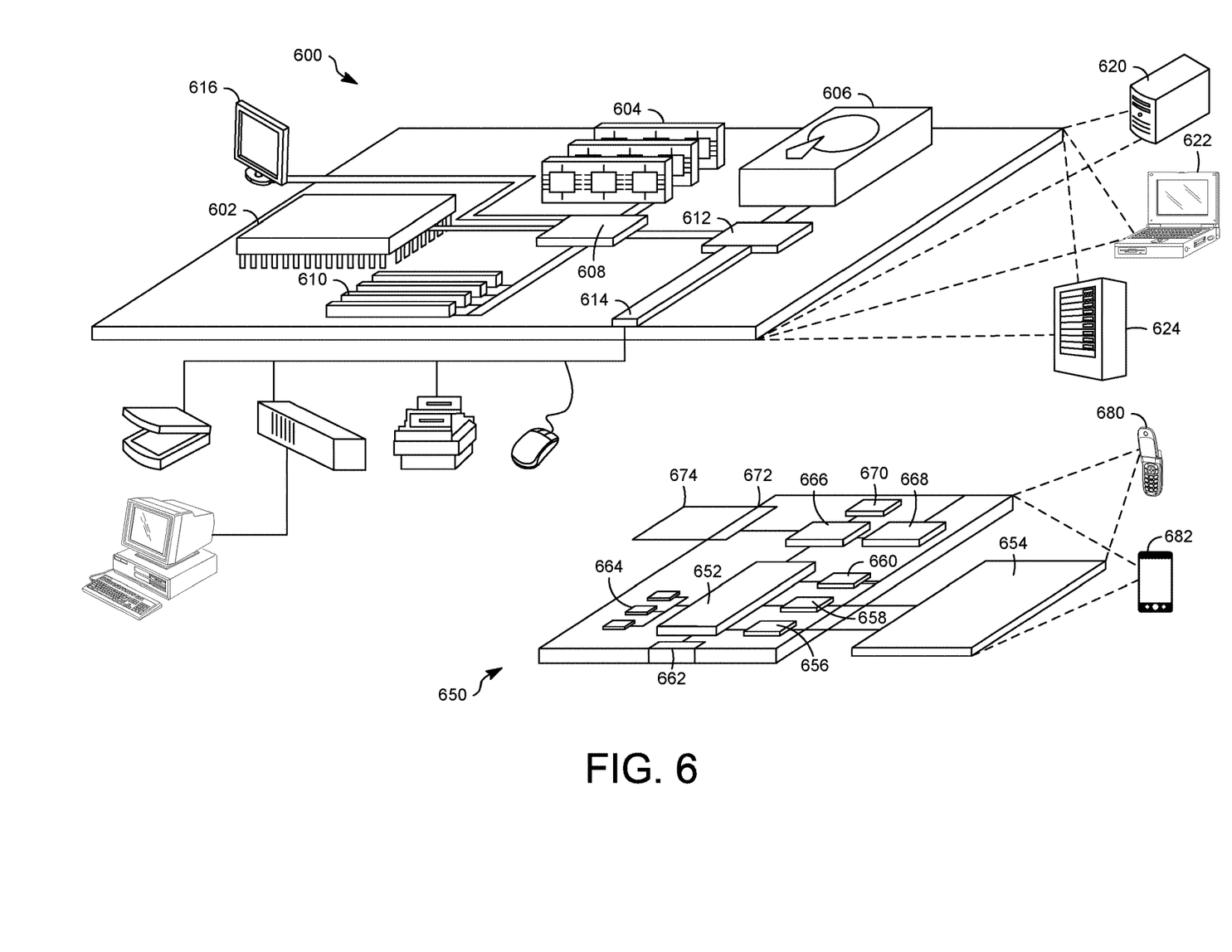
FIG. 6 is a diagram illustrating a computer device and a mobile computer device that can be used to implement the techniques described here.

FIG. 6 is a diagram illustrating example of a generic computer device 600 and a generic mobile computer device 650, which may be used with (to implement) the techniques described here. Computing device 600 is intended to represent various forms of digital computers, such as laptops, desktops, tablets, workstations, personal digital assistants, televisions, servers, blade servers, mainframes, and other appropriate computing devices. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic disks, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, by an electronic device including a plurality of functional elements, an indication of a specific service to be implemented by the electronic device, the electronic device being configured to operate as a full-featured device, or to implement one or more of a plurality of specific services, the electronic device being configured to implement the plurality of specific services using respective subsets of the plurality of functional elements of the electronic device, the specific service to be implemented being one of the plurality of specific services of the electronic device;
   in response to the indication of the specific service to be implemented, determining, by the electronic device, two or more functional elements of the electronic device that are needed to implement the indicated specific service, the two or more functional elements needed to implement the indicated specific service being a first subset of the plurality of functional elements of the electronic device, the first subset of the plurality of functional elements including one or more portions of a general purpose operating system of the electronic device; and
   initializing the electronic device by activating, using a processor of the electronic device, the first subset of the plurality of functional elements, without activating one or more functional elements of the electronic device not included in the first subset of the plurality of functional elements, the activating including:
      determining that activation of a first functional element is dependent on a second functional element, at least the first functional element being included in the first subset;
      activating the second functional element and, subsequently, activating the first functional element using the second functional element;
      in the event the second functional element is not included in the first subset, deactivating the second functional element; and
   after the initializing, implementing the indicated specific service with the first subset of the plurality of functional elements of the electronic device, the indicated specific service being a first specific service of the electronic device.

2. The computer-implemented method of claim 1, wherein the two or more functional elements needed to implement the first specific service are indicated in a table associated with the first specific service.

3. The computer-implemented method of claim 1, wherein initializing the electronic device includes executing, by the electronic device, an initialization script associated with the first specific service.

4. The computer-implemented method of claim 1, wherein the two or more functional elements needed to implement the first specific service include at least one of:
   an application program;
   an application program interface;
   a hardware device;
   a codec; and
   a device driver.

5. The computer-implemented method of claim 1, wherein receiving the indication to implement the first specific service includes receiving a user input.

6. The computer-implemented method of claim 1, further comprising:
   determining that a functional element needed to implement the first specific service is not present on the electronic device;
   activating a functional element of the electronic device not included in the first subset;
   obtaining the functional element not present on the electronic device using the functional element not included in the first subset; and
   after obtaining the functional element not present on the electronic device:
      activating the obtained functional element; and
      deactivating the functional element not included in the first subset.

7. The computer-implemented method of claim 1, further comprising, while implementing the first specific service:
   receiving, by the electronic device, an indication of a second specific service to be implemented by the electronic device;
   determining one or more functional elements of the electronic device needed to implement the second specific service, the one or more functional elements needed to implement the second specific service being a second subset of the plurality of functional elements of the electronic device that includes at least one functional element of the plurality of functional elements not included the first subset;
   determining one or more functional elements of the second subset not included in the first subset;
   activating the one or more functional elements of the second subset not included in the first subset; and
   implementing the second specific service with the second subset of the plurality of functional elements of the electronic device.

8. The computer-implemented method of claim 7, wherein the indication of the second specific service is received from the first specific service.

9. The computer-implemented method of claim 7, further comprising:
   receiving, by the electronic device, an indication to stop implementing the first specific service; and
   in response to the indication to stop implementing the first specific service, deactivating functional elements of the first subset that are not included in the second subset.

10. The computer-implemented method of claim 7, wherein the indication of the second specific service to be implemented is provided by a functional element of the plurality of functional elements of the electronic device.

11. A non-transitory computer readable medium having code segments stored thereon, the code segments, when executed by a processor included in a device having a plurality of functional elements, results in the processor and the device collectively:
- receiving an indication of a specific service to be implemented by the device, the device being configured to operate as a full-featured device, or to implement one or more of a plurality of specific services, the device being configured to implement the plurality of specific services using respective subsets of the plurality of functional elements of the device, the specific service to be implemented being one of the plurality of specific services of the device;
- in response to the indication of the specific service to be implemented, determining two or more functional elements of the device that are needed to implement the indicated specific service, the two or more functional elements needed to implement the indicated specific service being a first subset of the plurality of functional elements of the device, the first subset of the plurality of functional elements including one or more portions of a general purpose operating system of the device; and
- initializing the device by activating the first subset of the plurality of functional elements, without activating one or more functional elements of the device not included in the first subset of the plurality of functional elements, activating the first subset of the plurality of functional elements including:
  - determining that activating a first functional element of the first subset is dependent on a second functional element;
  - activating the second functional element and, subsequently, activating the first functional element using the second functional element;
  - in the event the second functional element is not included in the first subset, deactivating the second functional element; and
- after the initializing, implementing the indicated specific service with the first subset of the plurality of functional elements of the device.

12. The non-transitory computer readable medium of claim 11, wherein the indicated specific service is a first specific service of the plurality of specific services, the code segments, when executed by the processor, further result in the processor and the device collectively:
- receiving, by the device, an indication of a second specific service to be implemented by the device;
- determining one or more functional elements of the device needed to implement the second specific service, the one or more functional elements needed to implement the second specific service being a second subset of the plurality of functional elements of the device that includes at least one functional element of the plurality of functional elements not included the first subset;
- determining one or more functional elements of the second subset not included in the first subset; and
- activating the one or more functional elements of the second subset not included in the first subset.

13. The non-transitory computer readable medium of claim 12, wherein the code segments, when executed by the processor, further result in the processor and the device collectively:
- receiving, by the device, an indication to stop implementing the first specific service; and
- in response to the indication to stop implementing the first specific service, deactivating functional elements of the first subset that are not included in the second subset.

14. The non-transitory computer readable medium of claim 11, wherein the code segments, when executed by the processor, further result in the processor and the device collectively:
- determining that a functional element needed to implement the indicated specific service is not present on the device;
- activating a functional element of the device not included in the first subset;
- obtaining the functional element not present on the device using the functional element not included in the first subset; and
- after obtaining the functional element not present on the device:
  - activating the obtained functional element; and
  - deactivating the functional element not included in the first subset.

15. A device comprising;
- a processor;
- a plurality of functional elements operatively associated with the processor; and
- a memory having instructions stored thereon, the instructions, when executed by the processor, cause the device to:
  - receive an indication of a specific service to be implemented by the device, the device being configured to operate as a full-featured device, or to implement one or more of a plurality of specific services, the device being configured to implement the plurality of specific services using respective subsets of the plurality of functional elements of the device, the specific service to be implemented being one of the plurality of specific services of the device;
  - in response to the indication of the specific service to be implemented, determine two or more functional elements of the device that are needed to implement the indicated specific service, the two or more functional elements needed to implement the indicated specific service being a first subset of the plurality of functional elements of the device, the first subset of the plurality of functional elements including one or more portions of a general purpose operating system of the device; and
  - initialize the device by activating the first subset of the plurality of functional elements, without activating one or more functional elements of the device not included in the first subset of the plurality of functional elements, the activating the first subset of the plurality of functional elements including:
    - determining that activating a first functional element of the first subset is dependent on a second functional element;
    - activating the second functional element and, subsequently, activating the first functional element using the second functional element;
    - in the event the second functional element is not included in the first subset, deactivating the second functional element; and
  - after the initializing, implementing the indicated specific service with the first subset of the plurality of functional elements of the device.

16. The device of claim 15, wherein initializing the device with only the functional elements needed to implement the indicated specific service includes executing, by the device, an initialization script associated with the indicated specific service.

17. The device of claim 15, wherein the two or more functional elements needed to implement the indicated specific service include at least one of:
    an application program;
    an application program interface;
    a hardware device;
    a codec; and
    a device driver.

18. The device of claim 15, wherein receiving the indication of the specific service includes receiving a user input.

19. The device of claim 15, wherein the indicated specific service is a first specific service of the plurality of specific services of the device, the instructions, when executed by the processor, further cause the device to:
    receive an indication of a second specific service to be implemented by the device;
    determine one or more functional elements of the device needed to implement the second specific service, the one or more functional elements needed to implement the second specific service being a second subset of the plurality of functional elements of the device that includes at least one functional element of the plurality of functional elements not included the first subset;
    determine one or more functional elements of the second subset not included in the first subset; and
    activate the one or more functional elements of the second subset not included in the first subset.

20. The device of claim 15, wherein activating the first subset of the plurality of functional elements includes:
    determining that a functional element needed to implement the indicated specific service is not present on the device;
    activating a functional element of the device not included in the first subset;
    obtaining the functional element not present on the device using the functional element not included in the first subset; and
    after obtaining the functional element not present on the device:
        activating the obtained functional element; and
        deactivating the functional element not included in the first subset.

21. The device of claim 19, wherein the indication of the second specific service is received from the first specific service.

22. The device of claim 19, wherein the instructions, when executed by the processor, further cause the device to:
    receive an indication to stop implementing the first specific service; and
    in response to the indication to stop implementing the first specific service, deactivate one or more functional elements of the first subset that are not included in the second subset.

23. The device of claim 19, wherein the instructions, when executed by the processor, further cause the device to:
    receive an indication to stop implementing the second specific service; and
    in response to the indication to stop implementing the second specific service, deactivate the one or more functional elements of the second subset not included in the first subset.

* * * * *